March 7, 1967 H. ENGELHARDT ET AL 3,308,010

CRYOGENIC AND THERMAL SEAL FOR ELECTRICAL MEMBERS

Original Filed July 26, 1960 2 Sheets-Sheet 1

INVENTORS:
Alfred M. Nelson
Hermann Engelhardt
By Smyth, Roston & Pavitt
Attorneys.

CRYOGENIC AND THERMAL SEAL FOR ELECTRICAL MEMBERS

Original Filed July 26, 1960 2 Sheets-Sheet 2

INVENTORS:
Alfred M. Nelson
Hermann Engelhardt
By Smyth, Roston & Pavitt
Attorneys.

United States Patent Office 3,308,010
Patented Mar. 7, 1967

3,308,010

CRYOGENIC AND THERMAL SEAL FOR ELECTRICAL MEMBERS

Hermann Engelhardt, Gardena, and Alfred M. Nelson, Redondo Beach, Calif., assignors to The Magnavox Company, Torrance, Calif., a corporation of Delaware Continuation of application Ser. No. 45,391, July 26, 1960. This application Mar. 23, 1966, Ser. No. 543,461
8 Claims. (Cl. 161—231)

This invention relates to magnetic information storage cards for use in card processing systems and apparatus, and also to methods and processes for manufacturing such magnetic information cards. This application is a continuation of application Serial No. 45,391 filed July 26, 1960, in the names of Hermann Engelhardt and Alfred M. Nelson, inventors, entitled, "Information Storage Card."

Magnetic information cards are utilized in data processing systems of the type disclosed in United States Letters Patent No. 2,997,173 issued August 22, 1961, to Alfred N. Nelson and Hans M. Stern. In such systems, binary data may be recorded on each of the information cards in the form of patterns of magnetized dots or areas with each of the magnetized dots representing a binary bit.

The magnetized dots on each of the information storage cards are usually arranged in a rectangular array, with the dots in each row being successively scanned by a corresponding one of a number of transducer heads. Each transducer head, in turn, produces electrical signals of one polarity or another depending upon the change in direction of magnetization of the scanned dots. The electrical signals may be used in a parallel readout type of system to represent the information recorded at the different successive positions on the card.

It is usual in these types of card processing systems and apparatus for the information storage cards to be carried on vacuum pressure transport drums adjacent to the transducer heads. It is also usual for the card transported in such apparatus to be transferred from one transport drum to another, from appropriate feeding stations to the drums, and from the drums to appropriate stacking or receiving stations. Such handling and transporting of the cards has an adverse wearing effect on the magnetic coating of conventional type cards, and tends to destroy the information stored on the cards. Not only is the efficiency of the cards impaired, but the abrasive action of the powdered magnetic coating on the cards has been found to have a damaging effect on the surfaces of the transducer heads themselves.

In addition to the rubber action described above which produces wear on the coating of the magnetic material on the cards, the cards may also be subject to wear by their engagement with one another while held in a stacked condition in the various feeding stations and receiving stations, and the cards may also be subject to shock as they are arrested, for example, when being deposited in a receiving station.

Patent application, Serial No. 758,517 filed September 2, 1958, by George P. Walker and John W. Burkig (now abandoned) disclosed a magnetic information card and method of making the card which avoids some of the above problems. The disclosed magnetic information card has improved mechanical properties and is designed for use in systems such as that described in the above-cited U.S. Patent No. 2,997,173 issued to Alfred M. Nelson and Hans M. Stern. For use in such systems, the cards must have a long life because they are not expendable. As disclosed in the application by Walker and Burkig (now abandoned), two sheets of polyethylene terephthalate marketed under the trademark "Mylar" are utilized to sandwich a mixture of a polyester adhesive and powdered ferric oxide ($Fe_2O_3$). The powdered ferric oxide provides for the magnetic properties, and the Mylar has a high resistance to abrasion so that the sandwich construction provides an adequate protection for the magnetic powder as the cards are processed in the card processing equipment.

The information storage card of the present invention is an improvement over the card disclosed in the application by Walker and Burkig (now abandoned). The improvements relate to the reduction of the tendency of the card to curl, and to increasing the peel strentgh of the cards for a given magnetic characteristic. When Mylar, in very thin sheets or films, is utilized as the sandwich overlay and substrate of the card, the cards have a tendency to curl. The tendency to curl is a complex function of a number of variables in the manufacturing process of the card and is also due to particular inherent characteristics of the Mylar which applicants have discovered. In various steps of the manufacturing process, the sandwiched mixture may be set at a curl due to passing over rolls or being subjected to differential temperature changes at its opposite sides. Moreover, Mylar is strain oriented with the strain orientation being crystalline and evidently established before polymerization. Because of the strain orientation, the thermal coefficient of expansion varies directionally in each piece of Mylar so that a sandwich structure tends to curl with temperature changes.

Applicants' method of manufacturing the information card includes the steps of determining the strain orientation of different sheets of Mylar and of matching the overlay and substrate of each sandwich structure in accordance with their determined strain orientations or crystalline alignments. Moreover, the tendency to curl due to setting the sandwiched magnetic layer at a curl is removed by a final flat laminating step at a temperature over the melting point of the adhesive in the magnetic layer. Further features of this invention relate to the utilization of an adhesive in the sandwiched layer which has a thermal coefficient of expansion corresponding to that of the Mylar overlay and substrate.

As indicated above, the sandwiched layer of the card includes a mixture of the ferric oxide and the adhesive. The thickness of the overall card and of the mixture layer is limited by requirements of the card processing apparatus and also by the peel strength of the cards. Peel strength is a measure of the tendency to resist the separation of the overlay or substrate layers of the card. In general, the greater the percentage of adhesive in the thin central layer, the greater the peel strength but the poorer the magnetic properties of the card because the percentage of ferric oxide in the central layer determines the magnetic recording characteristic of the card. Features of this invention relate to the provision of a process of card fabrication which results in a card having both high peel strength and high magnetic density.

The process includes the step of mixing a dispersion or wetting agent with the mixture of oxide and grinding the mixture for a considerable interval to reduce particle size and to ensure complete dispersion of the wetting agent. The interval is limited by the fact that excessive grinding destroys the magnetic characteristics of the ferric oxide. The adhesive is added to the ground mixture together with a solvent and inhibitor which decreases the volatility. The resultant mixture is then further ground for a considerable interval to coat each wetted particle of ferric oxide with the adhesive. The wetting agent ensures that each particle of ferric oxide is fully coated or wetted by the adhesive solution. A controlled thickness of the ground mixture is spread over the overlay and substrate which have been matched in accordance with their strain orientation. The coated substrate and overlays are then heated to evaporate the solvent and laminated at an elevated temperature with the lamination removing tendency to curl due to differential shrink of the mixture.

Further advantages and features of this invention will become apparent upon consideration of the following description when read in conjunction with the drawing wherein.

Figure 1:
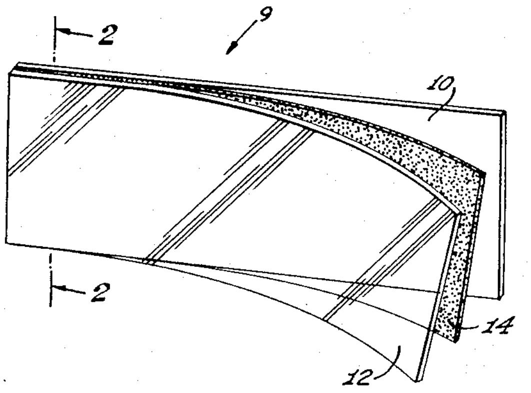
FIGURE 1 is a partially exploded perspective view of a magnetic card constituting one embodiment of this invention.
Figure 2:
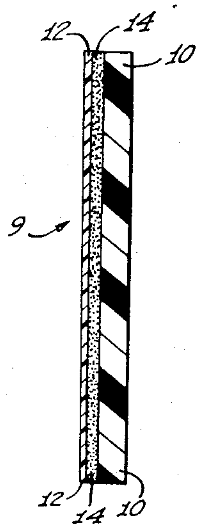
FIGURE 2 is a sectional view of the embodiment of the magnetic card illustrated in FIGURE 1 taken along lines 2—2 of FIGURE 1 with the thickness of the various layers being exaggerated.

Referring first to FIGURES 1 and 2, the information storage card 9 of this invention includes a base or substrate 10 which may illustratively have a thickness of 5 mils (0.005 inch). The substrate 10 may be made of a polyethylene terephthalate material. The substrate 10 may have a generally rectangular configuration, illustratively, 1 inch by 3 inches. The information card 9 also includes a rectangular overlay 12 having the same rectangular dimensions as the substrate 10 and, illustratively, a thickness of ½ mil (0.0005 inch). The overlay 12 may also be made of the polyethylene terephthalate material. Sandwiched between the substrate 10 and the overlay 12 is a layer 14 of a suitable mixture, hereinafter described in detail, including an adhesive and a powdered magnetic substance such as ferric oxide ($Fe_2O_3$). The layer 14 may illustratively have a thickness of approximately 0.8 mils (0.0008 inch) so that the overall thickness of the information card 9 is 6.3 mils (0.0063 inch). The card 9 is, accordingly, quite thin. The tolerance of thickness of the various layers of the card 9 is somewhat stringent providing illustratively for +0.0002 inch tolerance for the overall thickness of the card 9. The variation of the thickness of the layer 14 is only +0.0001 inch.

The central layer 14 provides the information card 9 with a number of important characteristics: first, the ferric oxide in the layer 14 provides the card 9 with magnetic properties so that information may be recorded thereon; and, second, the adhesive in the layer 14 affixes the overlay 12 to the substrate 10 binding the ferric oxide therebetween. The peel strength or tendency to resist separation or delamination between the overlay 12 and the substrate 10 is dependent in part upon the percentage of adhesive in the layer 14, and the magnetic properties of the card 9 depends upon the amount of ferric oxide in the layer 14. The thickness of the layer 14 is restricted by requirements of the card processing apparatus, and the magnetic properties of the card depends upon the percentage of ferric oxide in the layer 14. Actually, the thickness of the magnetic layer 14 effects magnetic resolution and thus information storage density. The thickness used is an optimal balance between total flux and resultant flux, with density, spacing, coercive force, etc., considered. The magnetic characteristics and the peel strength each require the increase respectively of the percentages of ferric oxide and adhesive which, of course, are incompatible requirements with a given thickness. The information card disclosed in the above-identified disclosure by Walker and Burkig (now abandoned) provides in one predetermined application for signals having a maximum amplitudes of approximately 15 millivolts. The information card 9 of the present invention provides for signals greater than 30 millivolts without increasing the thickness of the layer 14 and without reducing the peel strength of the card 9.

To fabricate the information card 9, the overlay 12 and the substrate 10 are individually coated with the magnetic dispersion mixture by a reverse roll coating operation. The thickness of the coating on the overlay 12 and substrate 10 depends upon the final laminated dry dispersion thickness required for the card 9. Illustratively, each coating may be 0.004 inch thick. As indicated above, the coating mixture which forms the central layer 14 may include a percentage of ferric oxide, and a percentage of a polyester adhesive. The ferric oxide should preferably be pure and with few contaminants.

The oxide-adhesive mixture forming layer 14 may be prepared in the following manner: approximately 175 grams of the ferric oxide is mixed with approximately 10 grams of a dispersion or wetting agent which may be a ester of succinic acid. The particular amount of the wetting agent mixed with the ferric oxide is not critical as, for example, amounts between 5 and 40 grams may be utilized. The utilization of the dispersion agent is a key factor in providing for the high peel strength of the card because of the greater resulting bond between the adhesive and the oxide. The ferric oxide and the dispersion agent are mixed in a ball mill for a relatively long time to reduce the particle size of the ferric oxide and to ensure that the particles of the ferric oxide are coated by the dispersion agent. The ball mill may utilize eighteen cylindrical balls, each ¾ inch in diameter, in a 1 quart ball mill jar. The ball mill grinding time may be between 25 and 100 hours and, illustratively, is 48 hours. If the grinding time is too long, the ferric oxide is ground down and its magnetic characteristics are impaired. The 48-hour ball mill time is a compromise between the desirability of completely mixing the ferric oxide and the dispersion agent and the necessity of maintaining the magnetic characteristics of the oxide.

After the ferric oxide and the dispersion agent have been ground in the ball mill, the polyester adhesive is added to the mixture. The adhesive may, illustratively, be formed in a manner similar to that disclosed in U.S. Patent No. 2,698,239, and the amount of adhesive added to the mixture may, illustratively, be approximately 325 grams. For such amounts, the resulting layer 14 of the card 9 has a 35% composition of the ferric oxide. Heretofore, percentages of such magnitude have been unobtainable in cards of suitable peel strength. In order words, when such relatively large percentages of ferric oxide have been utilized, the overlay 12 and substrate 10 separate upon repeated use in the card processing equipment.

To the mixture of ferric oxide, dispersion agent and adhesive, is then added a solvent for reducing the viscosity of the adhesive. The solvent may be methyl ethyl ketone, cyclohexanone, trichloroethane (1,1,2) and, illustratively, the amount of solvent added to the mixture may be 150 milliliters. The proportion of solvent to the adhesive is not critical, as the only purpose of the solvent is to reduce the viscosity of the adhesive. For example, the amount of solvent may be between 50 and 100 milliliters and the exact amount used depends upon the viscosity of the adhesive. The solvent is later evaporated, as is hereinafter described. In addition to the solvent, a volatility inhibitor is added to the mixture so as to maintain the solvent in the mixture for an additional grinding interval. The volatility inhibitor may be methyl isobutyl ketone and the amount of the inhibitor added to the mixture may be 20 milliliters. Again, the amount of this component is not critical as an amount between 10 and 40 milliliters is satisfactory. Finally, in addition to the volatility inhibitor, a modifier for the solvent may be added to the mixture to adapt it to the particular adhesive. The modifier may be toluene and the amount added may be between 5 and 30 milliliters and, illustratively, 10 milliliters.

The mixture then may contain the following constituents by weight:

| | Percent, approximately |
|---|---|
| Ferric oxide powder | 50.14 |
| Dispersion agent | 1.00 |
| Solvent | 18.00 |
| Adhesive | 27.00 |
| Volatility inhibitor | 2.5 |
| Solvent modifier | 1.00 |

The various constituents of the resulting mixture are then ground in the ball mill for an additional interval to increase the total grinding time to 48 to 70 hours. Illustratively, the additional ball mill time may be 22 hours, so that with an initial grinding interval of 48 hours, a total mixing time of 70 hours is provided. The additional ball mill time fully mixes the adhesive in solution with the ferric oxide. The dispersion agent ensures that the adhesive fully covers each particle of the ferric oxide.

The reason for the relatively long total grinding time is to ensure not only the complete mixing of the various components of the mixture but also to provide a very small particle size of the ferric oxide. The smaller the particle size of the ferric oxide, the greater is the resultant peel strength and the binding between the adhesive and the ferric oxide.

Aftr the additional grinding, the ground mixture is spread on both the overlay 12 and the substrate 10 utilizing a wired-wrapped raised steel rod. A reversed roll coating operation may also be utilized to give a controlled thickness. Illustratively, as indicated above, each coating may be 0.0004 inch thick. The coated overlay and substrate are then heated, utilizing, illustratively, a heat lamp in a drying oven to dry out the solvent before the overlay 12 and the substrate 10 are laminated. The heating time may, illustratively, be 2 to 3 minutes. In a volume process for fabricating the magnetic cards, rolls of the Mylar are continuously coated and passed through a drying oven. If the rolls of Mylar are used, the coated layers are combined by passing then through combining rolls which apply light pressure at a low temperature in the order of 200° F. A bond is not effected at the combining rolls. The combined layers are then cut to size.

If the Mylar is cut to size before coating, the coated overlay 12 and substrate 10 are laminated and placed between padded steel laminating plates spaced apart by approximately 1/32 inch. The steel plates are then placed in a laminating press for a few minutes without pressure and then pressure, illustratively, 165 pounds per square inch at an elevated temperature of 275° F. to 280° F. is applied for an illustrative interval of ten minutes. The steel plates are then removed from the laminating press and the laminated card 9 is chilled. The laminating step is the same for the volume process.

When the card 9 is chilled or cooled to ambient room temperature, there is a tendency for the card to curl. The card 9, as indicated above, is quite thin and flexible and tends to curl with relatively small stresses set up in any of the layers of the card. The curl in the card 9 is actually a complex function of a number of variables in the manufacturing process of the card. Important features of this invention pertain to the provision of a process which produces a card without any material tendency to curl. A curled card is unusable in the card processing apparatus of the type disclosed in the above-mentioned Patent No. 2,997,173 issued to Alfred M. Nelson and Hans M. Stern.

One factor affecting curl in the continuous process is a differential shrink of the thin overlay 12 due to the fact that only one of the combining rolls may be heated. This factor and others introducing differential shrinking or expansion of the layers are removed in the final laminating step at the elevated bonding temperature. The Mylar should not be heated for a substantial interval over 280° F. because it deteriorates. The major curl factor, however, which is due to the particular characteristics of the Mylar is not removed by the lamination operation.

The major curl factor is removed by laminating the overlay 12 and the substrate 10 in a particular orientation with respect to each other. The card 9 is relatively large and very thin so that if the overlay 12 and the substrate 10 have different coefficients of thermal expansion in different directions, the card curls when it is removed from the laminating press. Applicants have discovered that Mylar is strain oriented not only due to physical tension in the Mylar, but due to a crystalline orientation. The orientation is generally at a 45 degree angle from the roll axis of the Mylar obtained in rolls from the DuPont Company. The crystalline structure is such as to provide a crystalline alignment at an angle which is 45 degrees from the longitudinal axis of the roll strip which is, of course, also 45 degrees from the roll axis.

Figure 3:
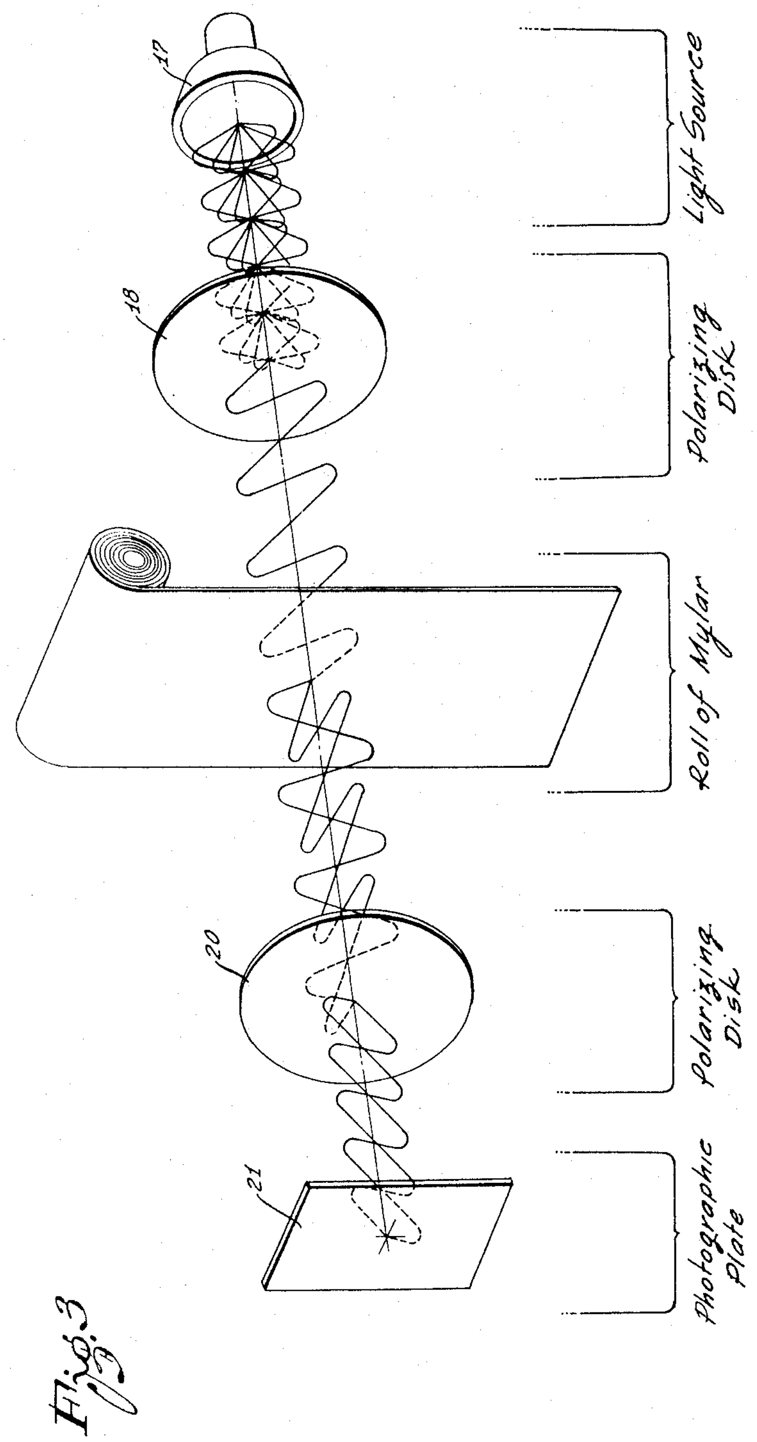
FIGURE 3 is a functional representation of equipment which may be utilized in the method of this invention to determine the strain orientation of the Mylar.

The particular crystalline orientation may be determined by polarized light apparatus depicted in FIGURE 3. A light source 17 provides light through a polarizing disc 18 to the Mylar sheet. The light from the Mylar is counled through a second polarizing disc 20 to a photographic plate 21 or the viewer. The discs 18 and 20 may be rotated slowly as the viewer observes the disc 20. Under the polarized light, a birefringent effect produces bright lines of light at approximately 45 degrees to the roll axis to the Myler. This plane of maximum light transmission can be utilized to match the substrate 10 and overlay 12. X-ray diffraction techniques resulting in segmented ring patterns may also be utilized to determine the crystalline orientation of the Mylar.

Figure 4A:
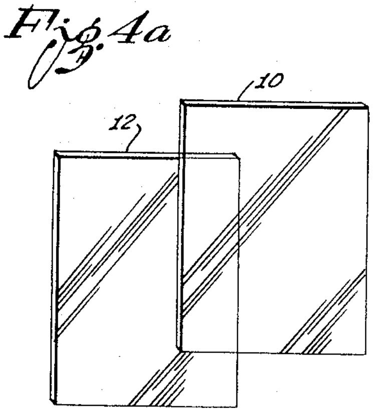
FIGURES 4*a* and 4*b* are pictorial views of the overlay and substrate Mylar layers of a card illustrating respectively matched and unmatched strain orientations.
Figure 4B:
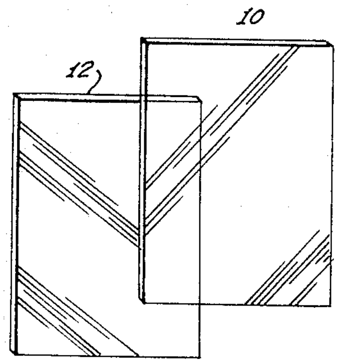

There is a different thermal contraction in the different directions of the overlay and substrate in accordance with the crystalline orientation, with the coefficient of the thermal expansion smaller in a direction parallel to the crystalline alignment. The alignment is functionally depicted in FIGURES 4*a* and 4*b*. In FIGURE 4*b*, the overlay 12 and substrate 10 are not oriented with respect to each other and a card made up in this manner curls. The card made by laminating the two pieces as in FIGURE 4*a*, however, does not curl because the thermal coefficient of contraction of the two layers are directionally the same. The thermal coefficient of contraction of the adhesive is substantially the same as the average of the Mylar so that a curl is not introduced by such factor.

Before the overlay 12 and substrate 10 are coated, the directivity of their thermal coefficients are determined. After coating, the overlay 12 and substrate 10 are laminated in accordance with FIGURE 4*a*. Actually, once the crystalline orientation of one piece of Mylar from a roll is determined, the orientation of the entire roll is generally determined. Each cut piece need not, therefore, be checked as long as the positional attitudes of the Mylar pieces are kept track of.

The curl in the information card is due to a complex function of a number of different variables in the card manufacturing process which set the adhesive in a curled condition, and it is also due to the differential thermal shrink of the overlay and substrate when the card is removed from the laminating press. The curl due to the setting of the adhesive in a curled condition is removed by placing the card in a flat press and elevating the temperature to the melting point of the adhesive. The curl due to differential thermal shrink is removed by aligning the crystalline structures of the overlay 12 and the substrate 10. The resulting card 9 lies flat and has good magnetic characteristics and high peel strength, these latter two characteristics being provided without increasing the thickness of the card.

Although this invention has been disclosed and illustrated with reference to particular applications, the principles involved are susceptible to numerous other applications which will be apparent to persons skilled in the art. The invention is, therefore, to be limited only as indicated by the scope of the appended claims.

We claim as our invention:

1. A method of making a magnetic information card, including:
   coating a first sheet of plastic having a particular crystalline alignment with a mixture of adhesive and magnetic material,
   coating a second sheet of plastic having a crystalline alignment orthogonal to the alignment of the first sheet with the mixture of adhesive and magnetic material,
   rotating one of the first and second sheets over the other so that the crystalline alignments of the first and the second sheets are the same, and
   laminating the first and the second sheets to bond the mixtures on each to the other.

2. A method of making a magnetic information card, including the steps of:
   determining the crystalline alignment of laminated pieces of polyethylene terephthalate,
   selecting two of the pieces of polyethylene terephthalate having the same crystalline orientation,
   coating one side of at least one of the two selected pieces with a mixture of a polyester adhesive and ferric oxide, and
   laminating the two pieces of polyethylene with the mixture therebetween and with their crystalline alignments being in the same direction so that the resultant laminated card does not curl with changes in temperature.

3. A method of making a magnetic information card, including the steps of mixing ferric oxide particles and a dispersion agent for a considerable interval of time to reduce the size of the particles and to fully disperse the dispersion agent in the ferric oxide particles,
   adding a polyester adhesive to the mixture of the ferric oxide particles and the dispersion agent with the amount added such that the ferric oxide particles are approximately 35% by weight of the total weight of the particles and the adhesive,
   adding a solvent to the mixture for reducing the viscosity of the polyester adhesive,
   adding a solvent volatility inhibitor to the mixture to maintain the solvent in the mixture during further grinding, mixing the mixture and adding components for a considerable interval of time,
   heating the resultant mixture to remove the solvent, and
   then placing the mixture after heating between two sheets of polyethylene terephthalate.

4. A method of making a magnetic information card in accordance with claim 3, including:
   the additional steps of determining the crystalline orientation of the two sheets of polyethylene terephthalate, and
   aligning the two sheets in accordance with their crystalline orientations to form a sandwich structure with a central layer of the mixture after heating.

5. An information storage element for use in data processing apparatus, including:
   a flat base member formed with a polyethylene terephthalate,
   a flat overlay of substantially the same length and width as the base member and formed from the same polyethylene terephthalate as the base member, said overlay also having a similar crystalline orientation as the base member,
   a mixture of polyester adhesive, and
   powdered ferric oxide sandwiched between the base member and the overlay, the overlay being positioned over the base member to form the sandwich arrangement with its crystalline orientation being aligned with the crystalline orientation of the base member.

6. A method of making a magnetic information card, consisting of the following steps:
   providing a base member with a flat surface and with a uniformly thin dimension in a direction transverse to the flat surface on the base member and with properties of withstanding shock and rubbing action without any deterioration in the base member or in the external configuration of the base member and with a crystalline structure, providing an overlay member with a flat surface and with a uniformly thin dimension in a direction transverse to the flat surface on the base member and with properties withstanding shock and rubbing action without any deterioration in the overlay member or in the external configuration of the overlay member and with a crystalline structure, intimately mixing particles of magnetizable material and an adhesive, coating the base member with the intimate mixture of the magnetizable particles and the adhesive, disposing the overlay member on the base member with the crystalline structures of the base member and the overlay member in aligned relationship, and heating the base member and the overlay member and the intimate mixture of the magnetizable particles and the adhesive.

7. The method set forth in claim 6 in which pressure is applied to the base member and the overlay member at elevated temperatures to bond the base member and the overlay member to each other and to the intimate mixture of the magnetizable material and the adhesive.

8. An information storage element for use in data processing apparatus, consisting of:
   a flat base member having a uniform thickness of thin dimensions and having properties withstanding shock and rubbing action without any deterioration in the base member or in the configuration of the base member and having a crystalline structure,
   a flat overlay member having a uniform thickness of thin dimensions and having properties withstanding the shock and rubbing action without any deterioration in the base member or in the configuration of the base member and having a crystalline structure, an adhesive, and a powder of magnetizable material, the adhesive and the powder being sandwiched between the base member and the overlay member in direct engagement with the base member and the overlay member and being intimately mixed to impart magnetic properties to the storage element, the base member and the overlay member being disposed relative to each other to provide an alignment in the crystalline structure of the base member and the overlay member.

References Cited by the Examiner

UNITED STATES PATENTS

| | | | |
|---|---|---|---|
| 2,333,463 | 11/1943 | Bryce | 235—61.12 |
| 2,375,315 | 5/1945 | Mixon | 252—352 |
| 2,765,251 | 10/1956 | Williams | 161—231 |
| 2,819,186 | 1/1958 | Franck | 117—76 |
| 2,923,642 | 2/1960 | Hausen | 274—41.4 |

EARL M. BERGERT, *Primary Examiner.*

C. B. COSBY, *Assistant Examiner.*